(12) United States Patent
Yoon

(10) Patent No.: US 10,897,724 B2
(45) Date of Patent: Jan. 19, 2021

(54) METHOD AND DEVICE FOR IMPROVING VOICE QUALITY IN MOBILE COMMUNICATION NETWORK

(71) Applicant: Samsung Electronics Co., Ltd., Gyeonggi-do (KR)

(72) Inventor: Taiho Yoon, Gyeonggi-do (KR)

(73) Assignee: Samsung Electronics Co., Ltd

(*) Notice: Subject to any disclaimer, the term of this patent is extended or adjusted under 35 U.S.C. 154(b) by 224 days.

(21) Appl. No.: 15/519,316

(22) PCT Filed: Oct. 13, 2015

(86) PCT No.: PCT/KR2015/010758
§ 371 (c)(1),
(2) Date: Apr. 14, 2017

(87) PCT Pub. No.: WO2016/060430
PCT Pub. Date: Apr. 21, 2016

(65) Prior Publication Data
US 2017/0245172 A1 Aug. 24, 2017

(30) Foreign Application Priority Data
Oct. 14, 2014 (KR) .................. 10-2014-0138423

(51) Int. Cl.
*H04W 28/04* (2009.01)
*H04W 88/08* (2009.01)
(Continued)

(52) U.S. Cl.
CPC .......... *H04W 28/04* (2013.01); *G10L 19/005* (2013.01); *H04L 1/0006* (2013.01);
(Continued)

(58) Field of Classification Search
CPC .................. H04W 28/04; H04W 88/08
See application file for complete search history.

(56) References Cited

U.S. PATENT DOCUMENTS

| 8,184,537 B1* | 5/2012 | Gopal | H04L 65/80 370/235 |
| 2005/0044471 A1* | 2/2005 | Chia | G10L 19/005 714/776 |

(Continued)

FOREIGN PATENT DOCUMENTS

| EP | 1 458 145 | 9/2004 |
| EP | 2129051 | 12/2009 |

(Continued)

OTHER PUBLICATIONS

PCT/ISA/210 Search Report issued on PCT/KR2015/010758 (pp. 3).

(Continued)

*Primary Examiner* — Walli Z Butt
*Assistant Examiner* — Thad N Defauw
(74) *Attorney, Agent, or Firm* — The Farrell Law Firm, P.C.

(57) ABSTRACT

An embodiment of the present invention may provide a method and a device for improving voice quality in a mobile communication network. An embodiment of the present invention may provide a method for improving communication quality by a base station and a device using the same, the method comprising the steps of: receiving, from a terminal, at least one internet protocol (IP)-based voice packet; determining whether a packet loss exists, on the basis of the received packet; generating compensation information corresponding to a lost packet when it is determined that a packet loss exists; and transmitting the compensation information.

16 Claims, 9 Drawing Sheets

(51) Int. Cl.
*H04L 1/20* (2006.01)
*H04L 1/00* (2006.01)
*G10L 19/005* (2013.01)
*G10L 19/012* (2013.01)

(52) U.S. Cl.
CPC ............ *H04L 1/0014* (2013.01); *H04L 1/203* (2013.01); *H04W 88/08* (2013.01); *G10L 19/012* (2013.01)

(56) References Cited

U.S. PATENT DOCUMENTS

| | | |
|---|---|---|
| 2008/0040122 A1 | 2/2008 | Chen et al. |
| 2008/0148329 A1 | 6/2008 | Costa et al. |
| 2008/0222475 A1 | 9/2008 | Nam |
| 2009/0037168 A1 | 2/2009 | Gao |
| 2009/0268667 A1 | 10/2009 | Gandham et al. |
| 2009/0281797 A1 | 11/2009 | Zopf et al. |
| 2010/0318869 A1* | 12/2010 | Kashima ............... H04L 1/0041 714/748 |
| 2011/0216664 A1* | 9/2011 | Okada .................... H04L 43/00 370/252 |
| 2012/0323567 A1 | 12/2012 | Gao |
| 2014/0105041 A1 | 4/2014 | Swaminathan et al. |
| 2015/0304966 A1 | 10/2015 | Park et al. |
| 2016/0241685 A1* | 8/2016 | Shah ....................... H04L 69/04 |

FOREIGN PATENT DOCUMENTS

| | | |
|---|---|---|
| KR | 1020140084241 | 7/2014 |
| WO | WO 2014109558 | 7/2014 |

OTHER PUBLICATIONS

PCT/ISA/237 Written Opinion issued on PCT/KR2015/010758 (pp. 6).

3GPP TS 48.103 version 9.1.0 Release 9, Apr. 2011, Digital cellular telecommunications system (Phase 2+); Base Station System—Media GateWay (BSS-MGW) interface; User plane transport mechanism, Copyright European Telecommunications Standards Institute 2011, pp. 22.

European Search Report dated Oct. 6, 2017 issued in counterpart application No. 15850238.5-1875, 10 pages.

* cited by examiner

METHOD AND DEVICE FOR IMPROVING VOICE QUALITY IN MOBILE COMMUNICATION NETWORK

PRIORITY

This application is a National Phase Entry of PCT International Application No. PCT/KR2015/010758 which was filed on Oct. 13, 2015, and claims priority to Korean Patent Application No. 10-2014-0138423, which was filed on Oct. 14, 2014, the contents of each of which are incorporated herein by reference.

TECHNICAL FIELD

The present invention relates to a method and a device for improving voice quality in a mobile communication network. Further, the present invention relates to a method and a device for preventing voice quality deterioration when a packet loss occurs in a mobile communication network.

BACKGROUND ART

In general, a mobile communication system has been developed for the purpose of providing communications while securing user's mobility. With the rapid progress of technology, such a mobile communication system can now provide not only voice communication but also high-speed data communication services. Recently, as one of the next-generation of mobile communication systems, researches for the evolution of Long Term Evolution-Advanced (LTE-A) in 3GPP are currently underway. With the standardization completion in the latter of 2010, technologies of LTE-A to achieve a higher transmission speed than the data rate that is currently provided have been discussed.

To keep pace with the LTE standardization completion, discussion of the LTE-Advanced (LTE-A) system has recently been regularized, which improves the transmission speed through grafting of various new technologies on the LTE communication system. Hereinafter, it may be understood that the LTE system includes the existing LTE system and the LTE-A system.

The LTE is the communication standard that is made only for data transmission, and thus does not include a technology related to a voice call for itself. However, since there are margins of communication speed or bandwidth, phone calls through the Internet can be made through Voice over LTE (VoLTE). In the same manner as Voice over Internet Protocol (VoIP) that is used by 070—Internet phone or mobile messenger apps, the VoLTE is a technology to send/receive compressed voice through a data network. However, the VoLTE is different from the VoIP on the point that it adjusts the transmission speed in accordance with the network situation and maintains the call quality so that call disconnection is prevented from occurring even in any situation.

In making the voice call, it is important to seamlessly maintain the call connection in addition to vivid hearing with high voice quality. For well maintenance of the connection state, the voice quality should be yielded, whereas for high-quality voice call, the connection state should be compromised. When using a communication service, such as website surfing, a user may not feel a temporary disconnection of the service to cause little inconvenience in use. However, in the case where the connection state of the voice service is not good, the voice may be shortly disconnected to cause a direct influence on the service quality. Accordingly, there has been a need for a technology that can prevent the voice call from being disconnected while maintaining the quality of voice services.

DISCLOSURE OF INVENTION

Technical Problem

The present invention has been made in order to solve the above problems, and an aspect of the present invention provides a method and a device for improving voice quality in a mobile communication network. Another aspect of the present invention provides a method and a device for preventing voice quality deterioration when a packet loss occurs in a mobile communication network. Still another aspect of the present invention provides a method and a device that can prevent voice quality deterioration that may occur if an uplink packet is lost during a voice call operation.

Solution to Problem

In one aspect of the present invention, a method for improving a communication quality of a base station includes: receiving at least one Internet Protocol (IP)-based voice packet from a terminal; determining whether a packet loss occurs on the basis of the received packet; generating compensation information that corresponds to the lost packet if it is determined that the packet loss has occurred; and transmitting the compensation information.

In another aspect of the present invention, a device for improving a communication quality of a base station includes: a transceiver unit configured to perform communication with at least one network node; and a lost packet controller configured to receive at least one Internet Protocol (IP)-based voice packet from a terminal, to determine whether a packet loss occurs on the basis of the received packet, to generate compensation information that corresponds to the lost packet if it is determined that the packet loss has occurred, and to transmit the compensation information.

Advantageous Effects of Invention

In accordance with the embodiments of the present invention, a method and a device for improving voice quality in a mobile communication network can be provided.

Further, in accordance with the embodiments of the present invention, a method and a device for preventing voice quality deterioration when a packet loss occurs in a mobile communication network can be provided. Further, in accordance with the embodiments of the present invention, a method and a device that can prevent voice quality deterioration that may occur if an uplink packet is lost during a voice call operation can be provided.

MODE FOR THE INVENTION

Figure 1:
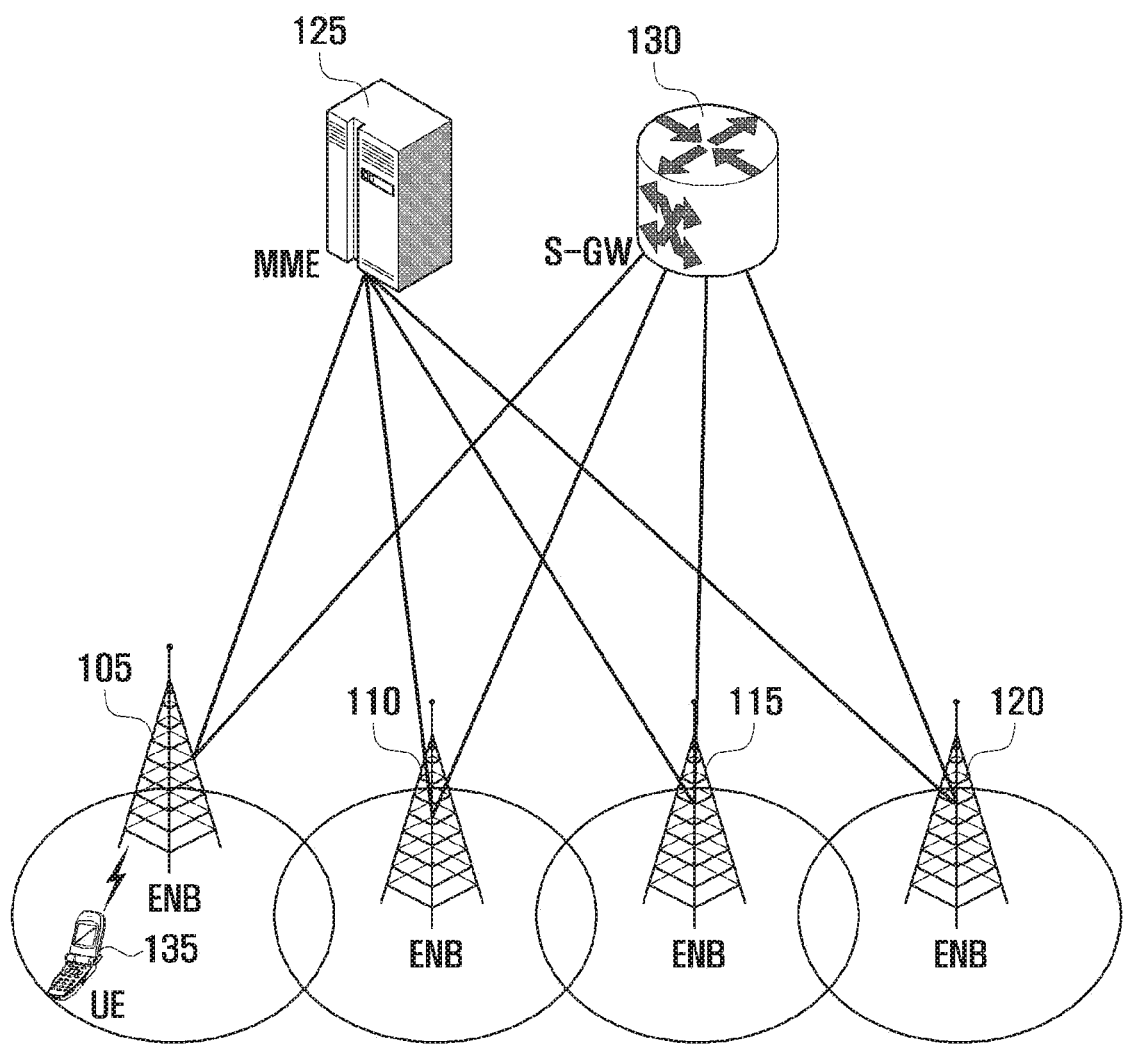
FIG. 1 is a diagram illustrating the structure of an LTE system to which the present invention is applied.

Hereinafter, various embodiments of the present invention will be described in detail with reference to the accompanying drawings. In the accompanying drawings, it should be noted that the same reference numerals are used for the same constituent elements. Further, detailed description of well-known functions or configurations incorporated herein may be omitted to avoid obscuring the subject matter of the present invention. In the following description, only portions that are required to understand the operations according to various embodiments of the present invention will be described, but description of other portions will be omitted to avoid obscuring the subject matter of the present invention.

The present invention may be applied to a mobile communication system, and in particular, may be applied to an Evolved Universal Mobile Telecommunications System (E-UMTS) that is evolved from a Universal Mobile Telecommunications System (UMTS). However, the present invention is not limited thereto, and may be applied to all communication systems and communication protocols to which the technical concept of the present invention can be applied.

An embodiment of the present invention provides a method and a device for preventing voice quality deterioration if a packet loss occurs during a voice call (e.g., Voice over LTE (VoLTE)) operation using an LTE network. Hereinafter, an embodiment will be described around the VoLTE of the LTE network, but the scope of the present invention is not limited thereto. The present invention may also be applied to a method for preventing communication quality deterioration that is caused by a packet loss in an IP-based traffic service of a Radio Link Control Unacknowledged Mode (RLC UM). The IP-based traffic service may be a Voice over IP (VoIP).

In an embodiment of the present invention, a Real-time Transport Protocol (RTP) may be used as a similar meaning to a voice packet. Further, the RTP may be used as a similar meaning to an uplink voice packet. In an embodiment of the present invention, an uplink or uplink traffic is traffic that is transmitted from a terminal to a base station.

In an embodiment of the present invention, a packet loss includes a case where a part of packets that are transmitted from a terminal to a base station is not received in the base station.

FIG. 1 is a diagram illustrating the structure of an LTE system to which the present invention is applied.

Referring to FIG. 1, a radio access network of an LTE system is composed of Evolved Node Bs (hereinafter referred to as "ENBs", "Node Bs", or "base stations") 105, 110, 115, and 120, a Mobility Management Entity (MME) 125, and a Serving-Gateway (S-GW) 130. User Equipment (hereinafter referred to as "UE" or "terminal") 135 is connected to an external network through the ENB 105 to 120 and the S-GW 130.

In FIG. 1, the ENB 105 to 120 corresponds to the existing Node B of a Universal Mobile Telecommunication System (UMTS). The ENB is connected to the UE 135 through a radio channel, and performs a more complicated role than the role of the existing Node B. Since all user traffics including a real-time service, such as a Voice over IP (VoIP) through the Internet protocol, are serviced through a shared channel, a device that performs scheduling through gathering of status information, such as a buffer status of the UE, an available transmission power status, and a channel status, is needed, and the ENB 105 to 120 takes charge of this. Typically, one ENB controls a plurality of cells. For example, in order to implement a transmission speed of 100 Mbps, the LTE system uses Orthogonal Frequency Division Multiplexing (hereinafter referred to as "OFDM") in the bandwidth of 20 MHz as a radio connection technology. Further, the ENB uses Adaptive Modulation & Coding (hereinafter referred to as "AMC") that determines a modulation scheme and a channel coding rate to match the channel status of the UE.

The S-GW 130 is a device that provides a data bearer, and generates or removes the data bearer in accordance with the control of the MME 125. The MME is a device that takes charge of not only mobility management of the UE but also various kinds of control functions, and is connected to a plurality of ENBs.

Figure 2:
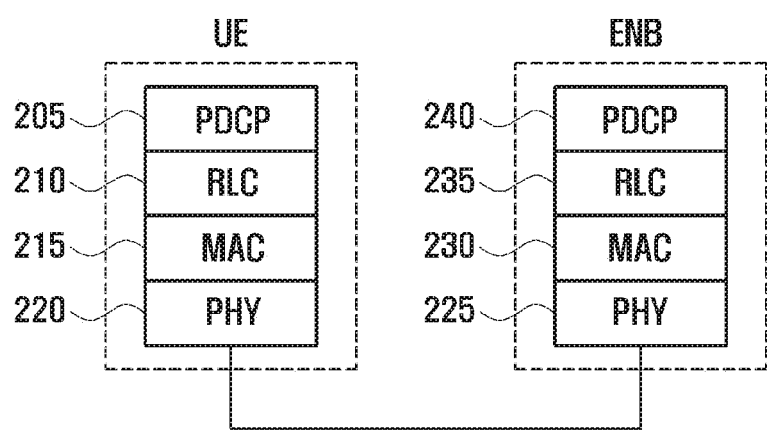
FIG. 2 is a diagram illustrating a wireless protocol structure in an LTE system to which the present invention is applied.

FIG. 2 is a diagram illustrating a radio protocol structure in an LTE system to which the present invention is applied.

Referring to FIG. 2, a radio protocol of an LTE system is composed of a Packet Data Convergence Protocol (PDCP) 205 or 240, a Radio Link Control (RLC) 210 or 235, and a Medium Access Control (MAC) 215 or 230 in each of UE and ENB. The Packet Data Convergence Protocol (PDCP) 205 or 240 takes charge of IP header compression/decompression operation, and the Radio Link Control (RLC) 210 or 235 reconfigures a PDCP Packet Data Unit (PDU) with an appropriate size. The MAC 215 or 230 is connected to various RLC layer devices that are configured in one UE, and performs multiplexing/demultiplexing of RLC PDUs to/from a MAC PDU.

A physical layer 220 or 225 performs channel coding and modulation of upper layer data and produces an OFDM symbol to transmit the OFDM symbol through a radio channel, or performs demodulation and channel decoding of the OFDM symbol that is received through the radio channel to transfer the demodulated and decoded OFDM symbol to an upper layer. Further, the physical layer uses Hybrid ARQ (HARQ) for additional error correction, and a receiving end transmits whether to receive a packet that is transmitted from a transmitting end with one bit. This is called HARQ ACK/NACK information. Downlink HARQ ACK/NACK information against uplink transmission may be transmitted through Physical Hybrid-ARQ Indicator Channel (PHICH), and uplink HARQ ACK/NACK information against downlink transmission may be transmitted through Physical Uplink Control Channel (PUCCH) or Physical Uplink Shared Channel (PUSCH).

The RLC layer is located in an upper position of a MAC layer to support reliable data transmission. Further, the RLC layer performs segmentation and concatenation of the RLC PDUs that are transferred from the upper layer in order to configure data having an appropriate size that suits a radio section. The receiving-side RLC layer supports data reassembly in order to recover the original RLC SDU from the received RLC PDUs. Each RLC entity may operate in a Transparent Mode (TM), Unacknowledged Mode (UM), or Acknowledged Mode (AM) in accordance with RLC SDU processing and transmission types.

In the TM, the RLC SDU that is from an upper layer is transferred to the MAC layer without adding any header information thereto. In the UM, the RLC PDUs can be configured through segmentation/concatenation of the RLC SDU, and header information that includes a serial number is attached to each of the RLC PDUs. In the UM, data retransmission and buffering are not supported. In the AM, the RLC PDUs are configured using the segmentation/concatenation of the RLC SDU, and packet retransmission may be performed when the packet transmission has failed.

Hereinafter, a case where IP traffic is transmitted and received in an RLC Unacknowledged Mode (RLC UM) according to an embodiment of the present invention will be exemplarily described. Most enterprises that operate VoLTE services operate voice calls on the basis of the RLC Unacknowledged Mode (RLC UM). In the case of the VoLTE, since real-time operation is required and retransmission is not greatly necessary, the enterprises operate VoLTE services normally in the RLC UM. In the RLC UM, there is not a Hybrid Automatic Retransmit Request (HARQ) in the RLC layer, and there is not a buffering operation in a Packet Data Convergence Protocol (PDCP) layer. For example, buffering of the VoLTE traffic is also not performed. Accordingly, the VoLTE service that is operated in the RLC UM has a potential problem of packet loss.

Since the VoLTE that is operated in the RLC UM does not perform the HARQ operation of the RLC layer and the buffering operation of the PDCP layer, there is a possibility that a packet loss or delay occurs due to external environment factors, such as timing of a handover message, network delay, and wireless environment, during a handover operation. Such a packet loss or delay increases jitter in the VoLTE to exert a bad influence on the voice quality, and causes a Mean Opinion Score (MOS) value that corresponds to the actual voice quality standard to be greatly deteriorated. The jitter means a delay difference between voice packets. More specifically, the statistical variance between voice packet arrival times is called the jitter.

A voice call for the VoLTE service may use two paths. One may be a signaling path for transferring control information, and the other may be an audio path for transferring an audio signal based on the Real-time Transport Protocol (RTP). The signaling path for transferring the control information may use a Session Initiation Protocol (SIP).

The SIP takes charge of a control function that is required to make and receive a kind of phone call. That is, a SIP message takes charge of the control function that is required to make and receive a phone call, such as a phone identification number, making a phone call, receiving a call, call waiting during calling, and call transfer. The SIP is composed of a text message, and transfers, to a SIP server, a command that is determined when respective functions are executed according to the RFC International Standard Regulations. The SIP server or IP/PBX server receives the message and performs a determined function.

The RTP means a network packet that is obtained by actually cutting data, such as audio, in the unit of a specific time. The packet means static data. RTCP is a protocol that serves as a manager when transferring such a packet. That is, in the VoLTE, the SIP may be a control function that is required to make and receive a phone call (number), whereas the RTP may be audio data itself that is transferred through the phone. The RTP may be called a voice packet, uplink voice packet, or voice traffic in the IP-based voice call.

Figure 3:
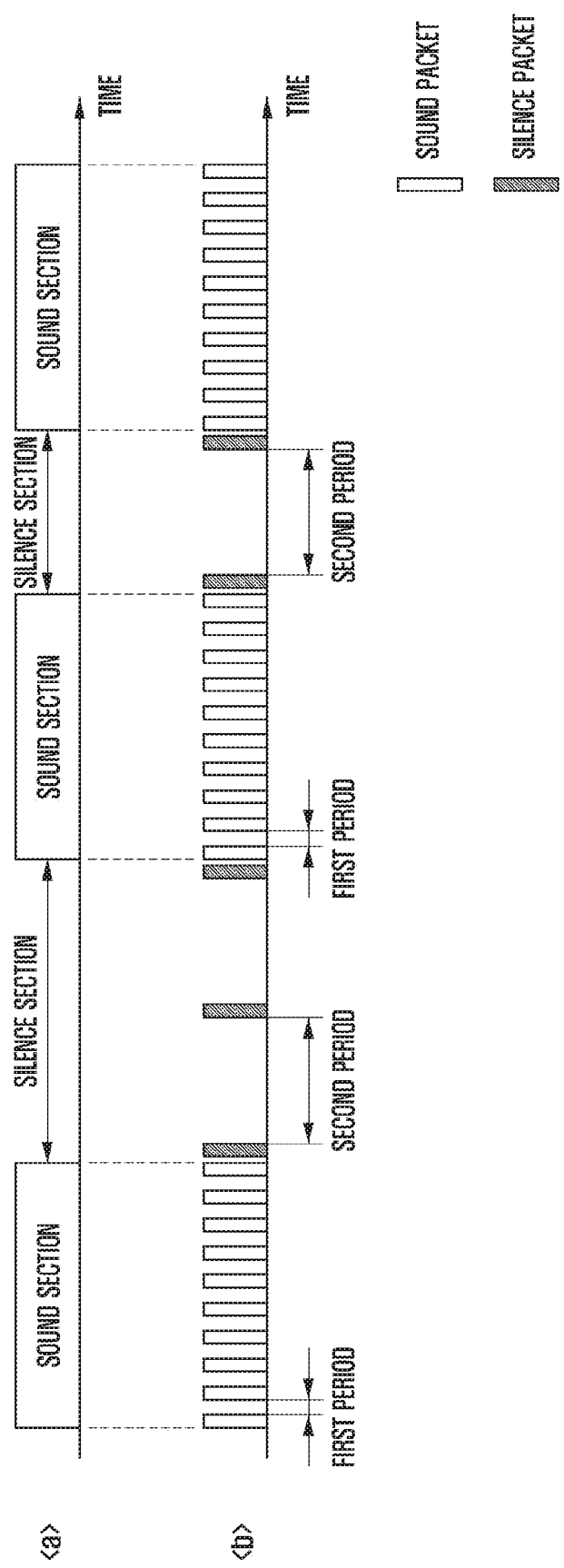
FIGS. 3A and 3B are diagrams explaining a method for transmitting traffic in an IP-based voice call according to an embodiment of the present invention.

FIGS. 3A and 3B are diagrams explaining a method for transmitting traffic in an IP-based voice call according to an embodiment of the present invention. The traffic includes a RTP that is transmitted from a user terminal to a base station. Referring to FIG. 3A, the RTP is composed of sound sections and silence section. In FIG. 3A, the sound sections are sections that are indicated by reference numerals 310, 320, and 330. The sound section is a section in which a direct sound source signal is input in a voice call, and the silence section is a section in which a sound source signal is not input. During the voice call, there exist sections in which the sound source is input and section in which the sound source is not input, and thus the sound sections and the silence sections may occur while the voice call is maintained. In general, about 30 to 50% of the entire sections of the VoLTE call may correspond to the silence sections.

Next, referring to FIG. 3B, generation of sound packets and silence packets will be described. In an IP-based voice call, an uplink voice packet that is transmitted from the terminal to the base station may be composed of sound packets and silence packets. The sound packet may be generated on the basis of a sound source signal that is input in the sound section, and the silence packet may be generated to support silence suppression in the silence section. The silence packet may include a Silence Indication (SID) packet. The terminal may generate and transmit the sound packets and the silence packets to the base station. The sound packet may be generated in every first period that is predetermined to correspond to the sound section. For example, the first period may be 20 ms. The silence packet may be generated in every second period that is predetermined to correspond to the silence section. For example, the second period may be 160 ms. The sound packet may be transmitted in every first period, and the silence packet may be transmitted in every second period. In an embodiment of the present invention, since the transmission periods of the sound packet and the silence packet differ from each other, the base station that receives the uplink voice packet can discriminate the kind of the packet on the basis of the reception period of the received voice packet.

An example in which RTP packets are constructed and transmitted will be briefly described as follows. In the VoIP, the voice traffic may be packetized through a VoIP codec. In this case, the packet size and the packet generation period may be determined in accordance with the codec. Examples of VoIP codecs that are widely used are G.711, G.729, Adaptive MultiRate (AMR), and Enhanced Variable Rate Codec (EVRC). For example, the AMR packetizes the sound source with one of 14 predetermined sizes for every 20 ms. Further, during the silence section for supporting the silence suppression, the Silence Indication (SID) packet may be transmitted for every 160 ms. The packet that is generated through the VoIP codec as described above is added with a Real-time Protocol (RT), a User Datagram Protocol (UDP), and an IP header, and is transmitted through an IP communication network. Since the size of a general voice packet is on the level of several tens of bytes, whereas a RTP/UDP/IP header reaches 40 bytes, the packet header overhead is quite large. Accordingly, the header size can be reduced in a manner that the packet header is compressed through Robust Header Compression (ROHC) or a duplicate packet header field is not transmitted through Payload Header Suppression (PHS).

Figure 4:
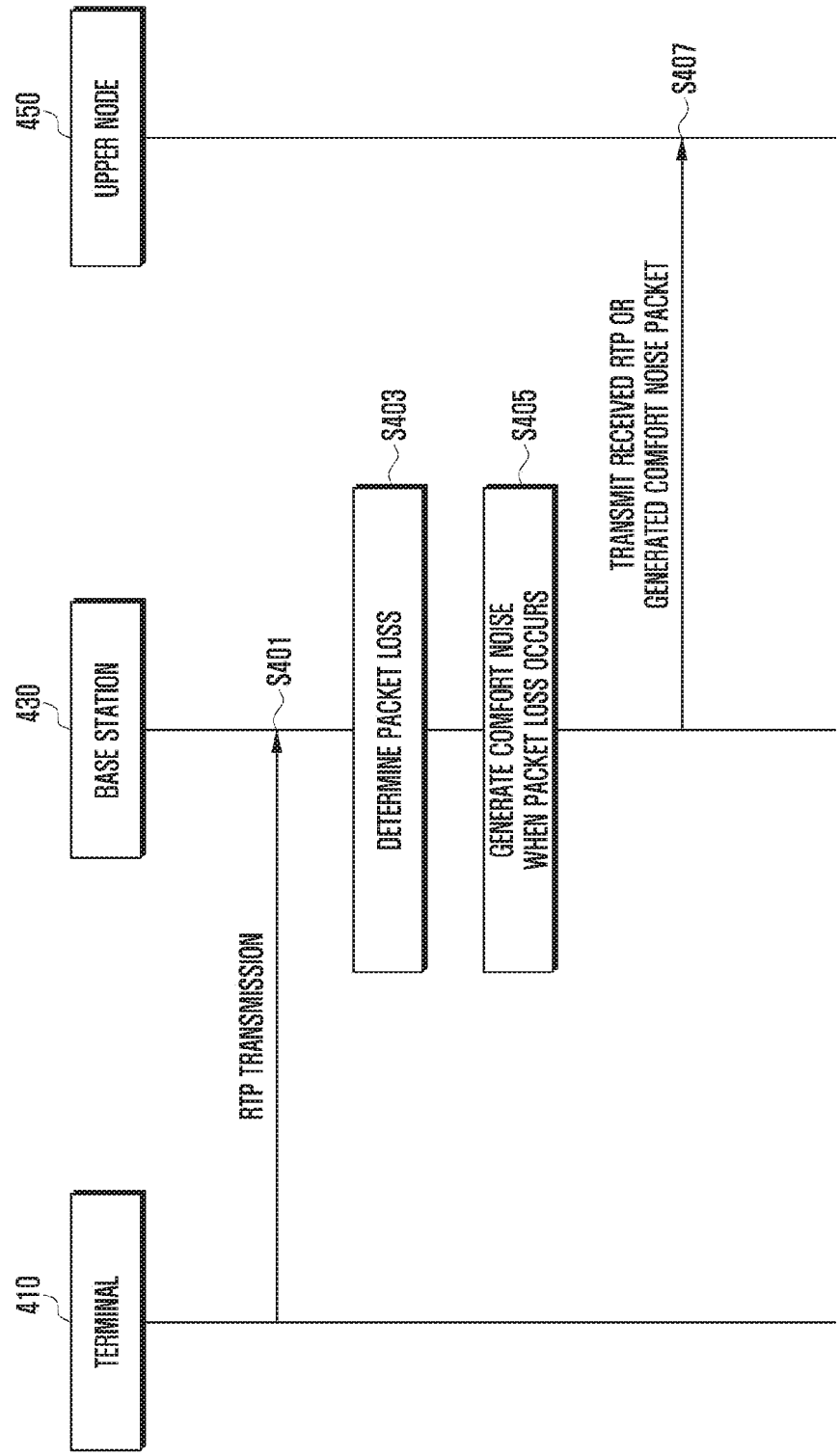
FIG. 4 is a diagram explaining a relationship between respective entities for a method for improving voice quality according to an embodiment of the present invention.

FIG. 4 is a diagram explaining a relationship between respective entities for a method for improving voice quality according to an embodiment of the present invention.

Referring to FIG. 4, an IP-based communication system may include a terminal 410, a base station 430, and an upper node 450. Referring to FIG. 4, in relation to an embodiment of the present invention, only a process will be described, in which the terminal 410 transmits an uplink voice packet to the base station 430, and the base station 430 processes the uplink packet that is received from the terminal 410 and transmits the processed uplink packet to the upper node 450. Hereinafter, a process in which a packet is transmitted from the upper node to a target terminal through the base station will be omitted.

In the IP-based communication, the terminal 410 may transmit the packet to the base station 430 (S401). In the IP-based communication, the packet may be the RTP.

The base station 430 that has received the RTP from the terminal 410 confirms whether a part of at least one uplink voice packet that is transmitted by the terminal is lost (S403). In a communication environment, a packet loss may occur in accordance with various factors. For example, the packet loss may be caused by handover timing, network delay, or wireless environment state.

The base station may confirm the packet loss on the basis of a sequence number of the uplink voice packet. Hereinafter, a method for confirming a packet loss using a sequence number of a packet will be described in more detail. Further, in an embodiment as below, it is exemplified that the packet loss is confirmed on the basis of a PDCP SN, but the method for confirming the packet loss according to the present invention is not limited thereto. In the VoLTE, each uplink voice packet includes a Sequence Number (SN) that corresponds to the corresponding packet. The sequence number may be a PDCP SN. In the case where the size of the PDCP SN is of 7 bits, the sequence number may have a value that is in the range of 0 to 127. The terminal 410 may generate a packet in the order of the sequence number, and may transmit the generated packet to the base station 430. Accordingly, on the assumption that the packets are to be received in accordance with the successive sequence numbers, the base station 430 may confirm the packet loss on the basis of the PDCP SN of the packet that is received from the terminal 410. A controller or a PDCP block of the base station may identify the packet loss.

For example, if the base station 430 receives a packet of which the PDCP SN value is n+3 after receiving a packet of which the PDCP SN value is n, it can confirm that two packets of which the PDCP SN values are n+1 and n+2 are lost. Further, when determining the packet loss, the base station 430 may additionally use a Hyper Frame Number (HFN). With respect to the HFN value n, a sequence number for the size of the PDCP SN may be set. For example, in the case where the size of the PDCP SN is of 7 bits, PDCP SN values of 0 to 127 may be set in due order with respect to the HFN value n. If up to the packet of which the PDCP SN value for the HFN value n is 127 is generated, next packets are generated, of which the PDCP SN values for the PDCP SN value n+1 are successively set to 0 to 127. Accordingly, the base station 430 may determine the packet loss in consideration of not only the PDCP SN value of the packet that is received from the terminal but also the HFN value.

If it is confirmed that the packet loss has occurred, the base station may generate an arbitrary packet that corresponds to the lost packet (S405). The arbitrary packet may be called a compensation packet. In an embodiment of the present invention, the base station 430 may compensate for the lost packet through generation of the arbitrary packet, and may prevent deterioration of the voice quality using the generated packet. The arbitrary packet may include a noise packet. Further, the noise packet may be a comfort noise packet. The comfort noise packet may be of RTP payload type 13. The arbitrary packet is not limited to the comfort noise packet. The base station may produce and transmit the comfort noise packet through the sequence number of the lost packet and the codec (AMR or AMR-WB in VoLTE).

The comfort noise is an artificial background sound that is used in the voice communication, and using the comfort noise, a user in the receiving end can feel more comfortable in comparison to a user who is in the silent environment. The comfort noise may be a noise that is arbitrarily generated. In the voice call receiving end, the user can feel as if the line is not disconnected to improve the call quality. Particularly, in an embodiment of the present invention, the base station 430 is featured to generate the comfort noise packet. That is, in an embodiment of the present invention, neither a transmission terminal generates and transmits a comfort noise packet to correspond to the silence section nor a reception terminal generates a comfort noise in the silence section of the received sound source signal. In an embodiment of the present invention, the base station generates a comfort noise packet as a packet that corresponds to the lost packet.

The base station 430 transmits the received RTP or the generated comfort noise packet to the upper node 450 (S407). The base station 430 may transmit the RTP that is normally received to the upper node 450, and may generate the comfort noise packet for the lost RTP to transmit the generated comfort noise packet to the upper node 450 in place of the lost RTP.

The upper node 450 may operate to transfer the packet that is received from the base station 430 to a target terminal.

Although it is exemplified that the base station directly generates the comfort noise packet that corresponds to the lost packet as described above, the base station may not directly generate the comfort noise packet, but may generate only indication information that indicates the packet loss. The indication information may include at least one of the packet loss number, the sequence number of a lost packet, and information that indicates existence of the packet loss of a specific size. Further, the indication information may indicate the kind of the lost packet. Here, the kind of the lost packet may be information that indicates whether the lost packet is a sound packet or a silence packet. The indication information may be called packet loss indication information. The indication information may indicate the packet loss so that the terminal that has received the indication information can generate a comfort noise that corresponds to the packet loss on the basis of the indication information. That is, in an embodiment of the present invention, the base station may directly generate the comfort noise packet that corresponds to the list packet, or may transmit the indication information on the packet loss, so that the upper node or the target terminal, which has received the indication information, can generate the comfort noise.

Figure 5:
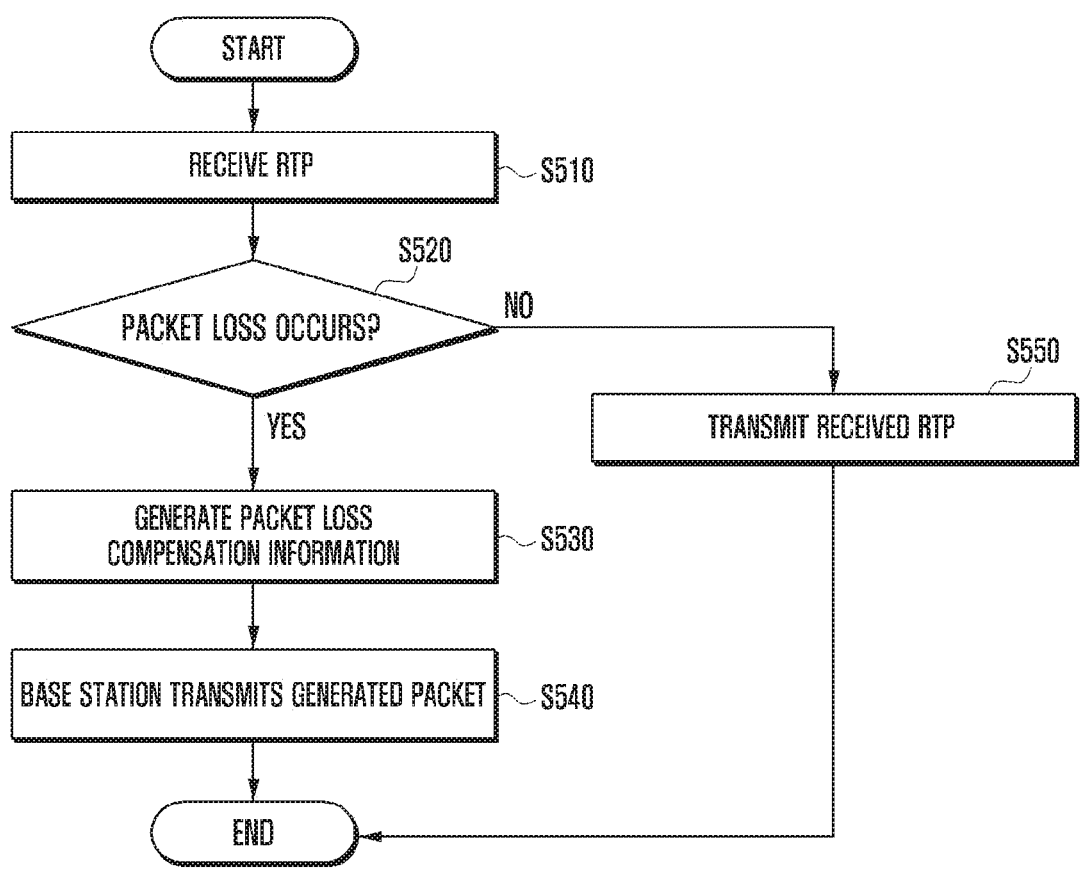
FIG. 5 is a diagram explaining the operation of a base station according to an embodiment of the present invention.

FIG. 5 is a diagram explaining the operation of a base station according to an embodiment of the present invention.

Referring to FIG. 5, a base station receives an RTP from a terminal (S510). The base station may receive a plurality of RTPs from the terminal.

The base station may determine whether a packet loss occurs with respect to the RTP that is received from the terminal (S520). For example, the base station may determine the packet loss on the basis of a PDCP SN of the received packet. The method for confirming the packet loss using the PDCP SN has been described with reference to FIG. 4.

If the packet loss is confirmed, the base station proceeds to operation S530. The base station may generate information for compensating for a lost packet (S530). The information for compensating for the lost packet may be an arbitrary packet. The base station may compensate for the lost packet through generation of the arbitrary packet. The arbitrary packet may be a noise packet. The noise packet may be a comfort noise packet. The comfort noise has been described with reference to FIG. 4.

Further, the information for compensating for the lost packet may be packet loss indication information. The indication information may be information that indicates occurrence of a loss of a specific number of packets or a loss of a packet having a specific size. An upper node or a target terminal, which has received the indication information, may generate the comfort noise to correspond to the indication information.

Thereafter, the base station may transmit the information for compensating for the lost packet which has been generated at operation S530 (S540). If the information for compensating for the lost packet corresponds to an arbitrary packet, the base station may transmit the arbitrary packet together with the received packet without any loss. For example, if a packet of which the PDCP SN value is n is received and a packet of which the PDCP SN value is n+3 is received, the base station may generate the packets of which the PDCP SN values are n+1 and N+2 as arbitrary packets. The base station may transmit a properly received packet of which the PDCP SN value is n, arbitrary packets of which the PDCP SN values correspond to n+1 and n+2, and a packet of which the PDCP SN value is n+3 in the order of their sequence numbers. If the information for compensating for the lost packet is the indication information, the base station may transmit the properly received packets of which the PDCP SN values are n and n+3 to the upper node, and may additionally transmit indication information for indicating that the packets of which the PDCP SN values are n+1 and n+2 have been lost. On the other hand, in an embodiment of the present invention, it may also be possible to transmit the indication information together with generation and transmission of arbitrary packets. That is, it is also possible to implement a combination of the embodiments of the present invention.

If it is determined that the packet loss does not occur at operation S520, the base station proceeds to operation S550. The base station transmits the received RTP to the upper node (S550).

Figure 6:
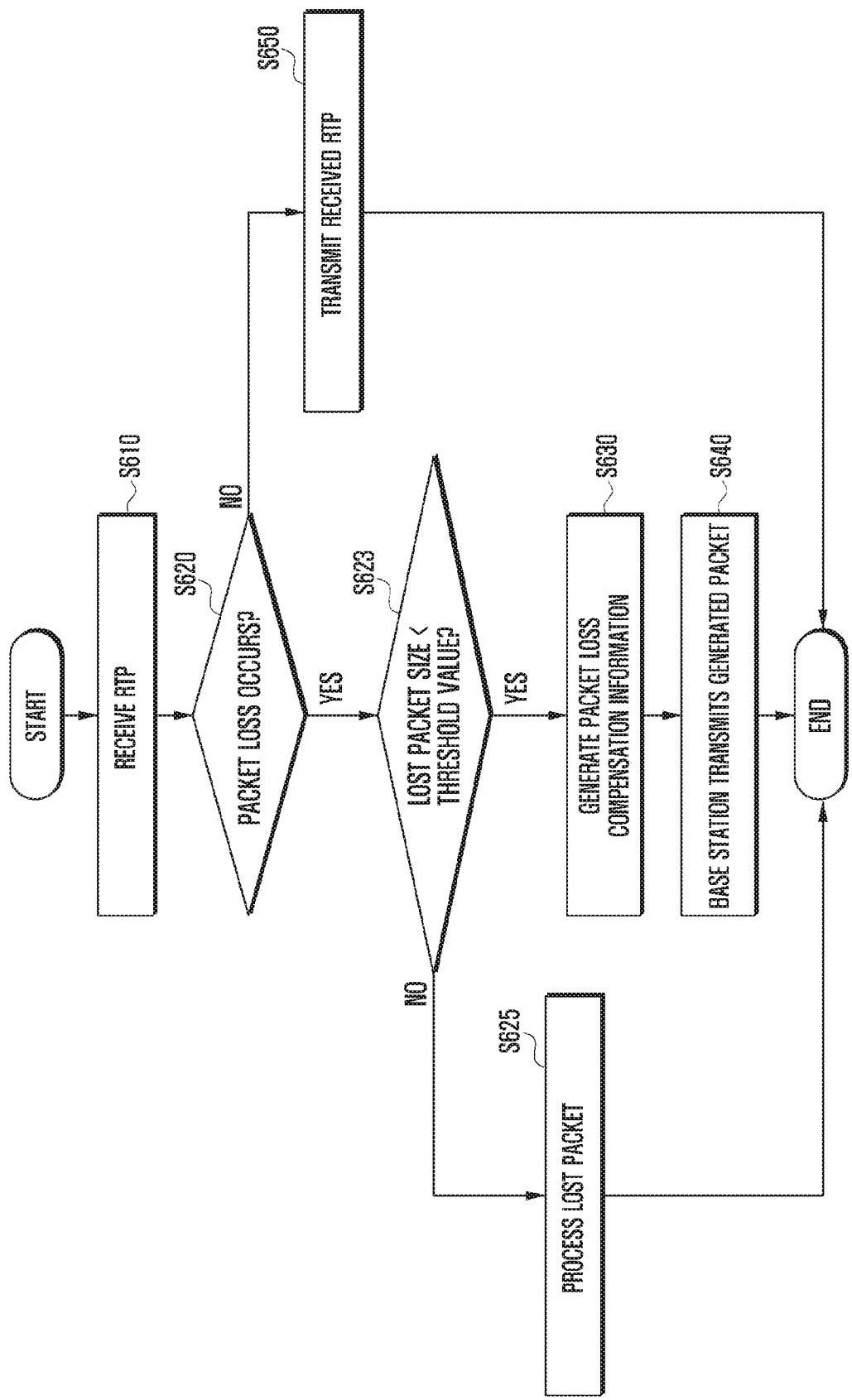
FIG. 6 is a diagram explaining the operation of a base station in accordance with the size of a lost packet according to an embodiment of the present invention.

FIG. 6 is a diagram explaining the operation of a base station in accordance with the size of a lost packet according to an embodiment of the present invention.

Referring to FIG. 6, a base station receives an RTP from a terminal (S610). The base station may receive a plurality of RTPs from the terminal.

The base station may determine whether a packet loss occurs with respect to the RTP that is received from the terminal (S620). For example, the base station may use the PDCP SN of the received packet.

If the packet loss is confirmed, the base station proceeds to operation S623. The base station may determine whether the size of the lost packets is smaller than a predetermined threshold value (S623). The packet size may correspond to the number of packets. In this case, the size or the number of the lost packets means the size or the number of the packets that are successively lost. Accordingly, it can be determined whether the number of the lost packets is smaller than the predetermined threshold value. The threshold value may be 100 ms. In general, a user cannot well recognize a loss that is within 100 ms. With respect to the packet loss having the size that cannot be well-recognized by the user, a comfort noise may be used to improve the call quality. If the size of the lost packets is equal to or larger than 100 ms, this corresponds to the loss that can be recognized by the user, and thus an insignificant effect may be obtained through the processing using the comfort noise. In this case, the user may temporarily experience call disconnection. Accordingly, it is required to use the threshold value for comparison with the lost packet size. For example, if voice disconnection for 20 to 40 ms occurs due to a loss of one or two RTPs, the user cannot recognize this, but this loss can be replaced by the comfort noise packet to improve the effective voice quality.

If the size of the lost packets is smaller than the predetermined value, the base station may generate information for compensating for the lost packet (S630). The information for compensating for the lost packet may be an arbitrary packet. The base station may compensate for the lost packet through generation of an arbitrary packet. The arbitrary packet may be a noise packet. Further, the information for compensating for the lost packet may be packet loss indication information.

Thereafter, the base station may transmit the information for compensating for the lost packet which has been generated at operation S630 (S640). If the information for compensating for the lost packet corresponds to an arbitrary packet, the base station may transmit the arbitrary packet together with the received packet without any loss.

If the size of the lost packet is equal to or larger than the predetermined threshold value at operation S623, the base station proceeds to operation S625. The base station may process the lost packet (S625). With respect to the lost packet, the base station may not transmit a separate packet, but may operate to transmit a packet that is normally received after the lost packet. Further, the base station may generate indication information that indicates the occurrence of the packet loss in which the lost packet exceeds the predetermined threshold value, and may transmit the generated information.

If it is determined that the packet loss does not occur at operation S620, the base station proceeds to operation S650. The base station transmits the received RTP to the upper node (S650).

Figure 7:
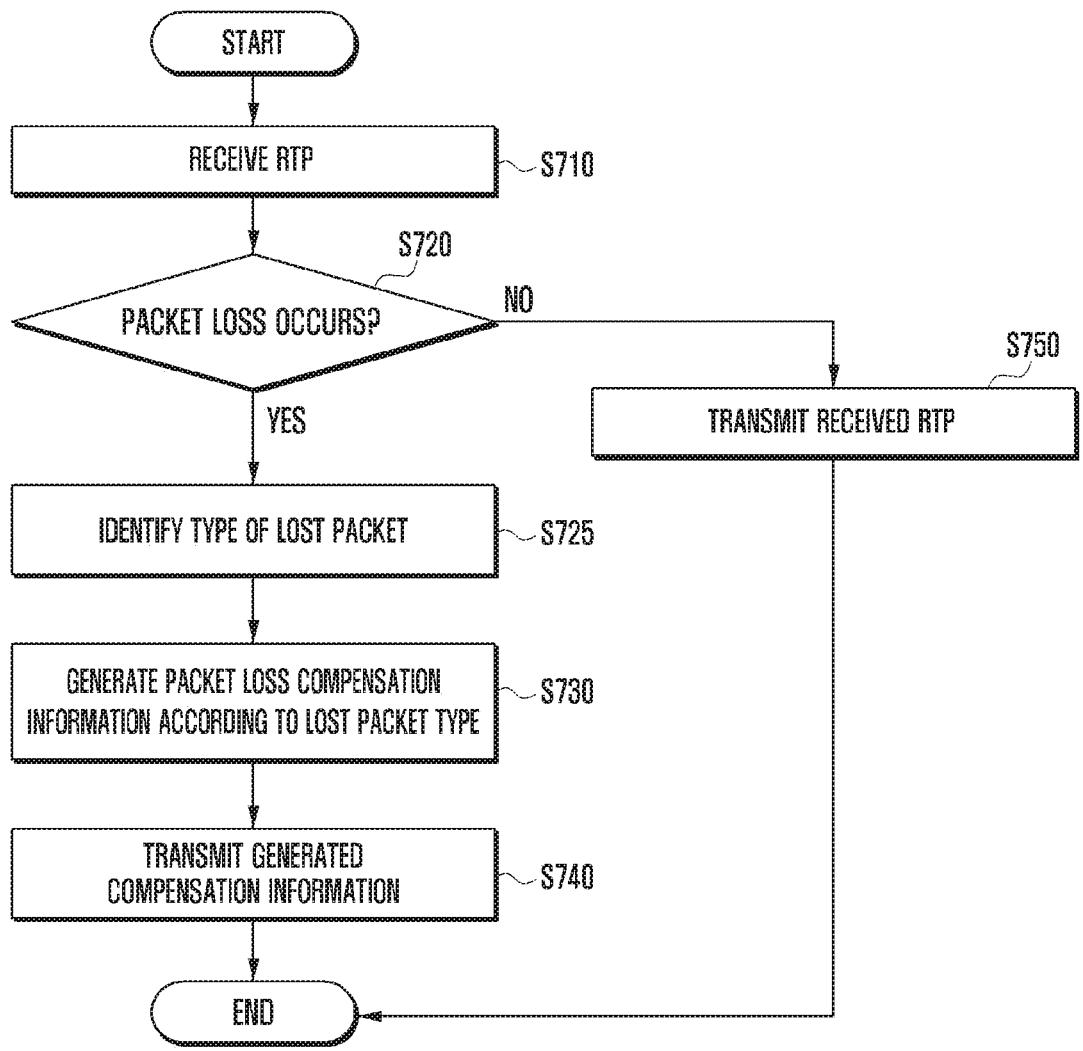
FIG. 7 is a diagram explaining the operation of a base station in accordance with the kind of an RTP according to an embodiment of the present invention.

FIG. 7 is a diagram explaining the operation of a base station in accordance with the kind of an RTP according to an embodiment of the present invention.

Referring to FIG. 7, a base station receives an RTP from a terminal (S710). The base station may receive a plurality of RTPs from the terminal.

The base station may determine whether a packet loss occurs with respect to the RTP that is received from the terminal (S720). For example, the base station may use the PDCP SN of the received packet.

If the packet loss is confirmed, the base station may proceed to operation S725. The base station may identify the type of the packet that is confirmed as the lost packet (S725). For example, the base station may confirm whether the type of the lost packet is a sound packet or a silence packet. The terminal may generate the sound packet on the basis of a sound source signal that is input in a sound section, and may generate the silence packet to support silence suppression in a silence section. The silence packet may include a Silence Indication (SID) packet.

The terminal may transmit the sound packets at a first interval, and may transmit the silence packets at a second interval. Here, the interval is a time interval for transmitting the packets. The first interval and the second interval may be different from each other. The first interval may be 20 ms, and the second interval may be 160 ms. The base station may determine the type of the lost packet on the basis of the interval characteristics of the received packets. For example, if one or more packet losses occur in a state where a normal packet reception interval is within the second interval, the base station may determine that the sound packet is lost. That is, if a packet of which the PDCP SN value is n is normally received and then a packet of which the PDCP SN value is n+2 is received, the base station may determine that a packet of which the PDCP SN value is n+1 is lost. In this case, if the reception time interval between the packet of which the PDCP SN value is n and the packet of which the PDCP SN value is n+2 is within the second interval, the base station may estimate that the lost packet is the sound packet. Even in the case where a plurality of packets are lost, the same method can be applied. Further, the base station may estimate the packet type in accordance with the number of the lost packets and the relationship between the reception time of the packet just before the packet loss and the time interval of the packet that is received just after the lost packet. For example, if 9 packets are lost and the normal packet reception interval is about 200 ms, the base station may estimate that the lost packets are the sound packets.

The base station may generate compensation information for the lost packet in accordance with the type of the lost packet. For example, if the sound packet is lost, the base station may generate the compensation information, whereas if the silence packet is lost, the base station may not generate the compensation information. The compensation information is the same as that as described above with reference to FIG. 4. On the other hand, in the case of the silence packet, the base station may generate compensation information that can be discriminated from the compensation information of the sound packet.

The base station may transmit the compensation information that is generated in accordance with the type of the lost packet to the upper node (S730). The compensation information may be transmitted to a target terminal. If the information for compensating for the lost packet corresponds to an arbitrary packet, the base station may transmit the arbitrary packet together with the received packet without any loss. In this case, the base station may transmit the packets in the order of the sequence numbers.

If it is determined that the packet loss does not occur at operation S720, the base station proceeds to operation S750. The base station transmits the received RTP to the upper node (S750).

As described above, the respective embodiments have been described with reference to FIGS. 5, 6, and 7 in a separate manner. However, this is for convenience in explanation, and it is also possible to embody the present invention through a combination of the respective embodiments. For example, the base station may confirm the packet loss, and then may generate the compensation information in accordance with the packet type with respect to the packet loss that is within the predetermined threshold value to transmit the generated compensation information.

Figure 8:
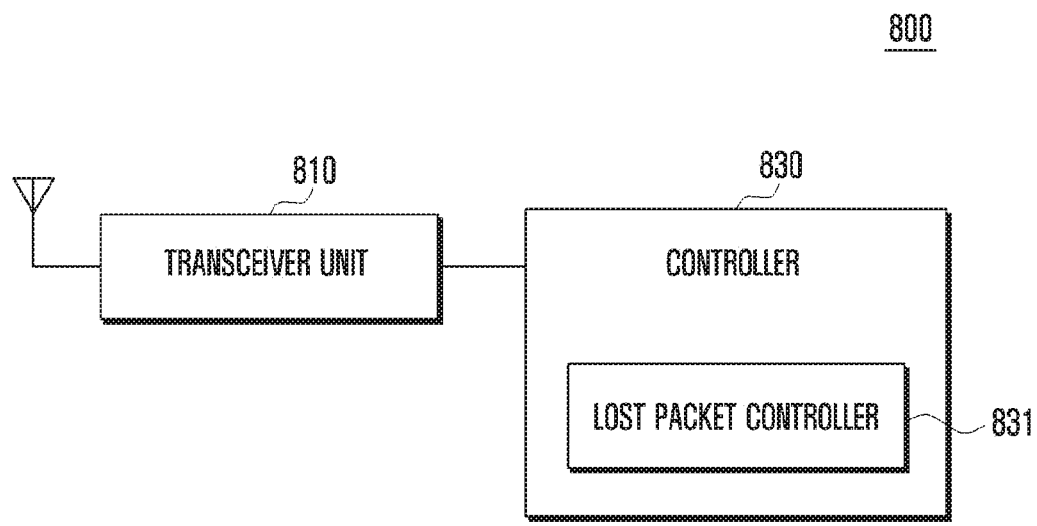
FIG. 8 is a diagram explaining a device of a base station according to an embodiment of the present invention.

FIG. 8 is a diagram explaining a device of a base station according to an embodiment of the present invention.

Referring to FIG. 8, a base station 800 may include a transceiver unit 810 and a controller 830. The transceiver unit 810 is used to transmit and receive signals with at least one network node. The controller 830 may control the overall operation of the base station 800. According to an embodiment of the present invention, the controller 830 may further include a lost packet controller 831. If a packet loss occurs in packets that are transmitted from a terminal to the base station 800, the lost packet controller 831 may compensate for the packet loss to prevent voice quality deterioration.

According to an embodiment of the present invention, the lost packet controller 831 may operate to receive at least one Internet Protocol (IP)-based voice packet from the terminal, to determine whether the packet loss occurs on the basis of the received packet, to generate compensation information that corresponds to the lost packet if it is determined that the packet loss has occurred, and to transmit the compensation information.

The compensation information may include an arbitrary packet that corresponds to the sequence number of the lost packet. The arbitrary packet may include a noise packet. Further, the compensation information may include sequence number information of the lost packet and information that indicates generation of a noise for the sequence number. The packet may be a VoLTE voice packet, and the voice packet may be transmitted and received in a radio link control unacknowledged mode.

Further, the lost packet controller 831 may operate to determine whether the packet loss has occurred on the basis of the sequence numbers of the packets that are received before and after the lost packet. Further, the lost packet controller 831 may operate to determine whether the number of the lost packets satisfies a predetermined threshold value condition and to generate the compensation information that corresponds to the lost packets if the threshold value condition is satisfied.

Further, the lost packet controller 831 may operate to determine the type of the lost packet and to generate the compensation information that corresponds to the lost packet if the lost packet is the sound packet. Further, the lost packet controller 831 may generate different compensation information in accordance with the type of the lost packet. Further, the lost packet controller 831 may operate to determine the type of the lost packet on the basis of reception time interval information of the packets that are received before and after the lost packet.

As described above, the base station 800 according to an embodiment of the present invention has been described in a state where it is divided by blocks. However, this is for convenience in explanation, and the configuration and the operation of the base station 800 according to the present invention is not limited thereto. In an embodiment of the present invention, the controller 830 may perform the operation of the lost packet controller 831. Further, the controller 830 may perform not only the operation of the base station as described above with reference to FIG. 8 but also the operation of the base station according to an embodiment of the present invention as described above with reference to FIGS. 3A to 7.

Figure 9:
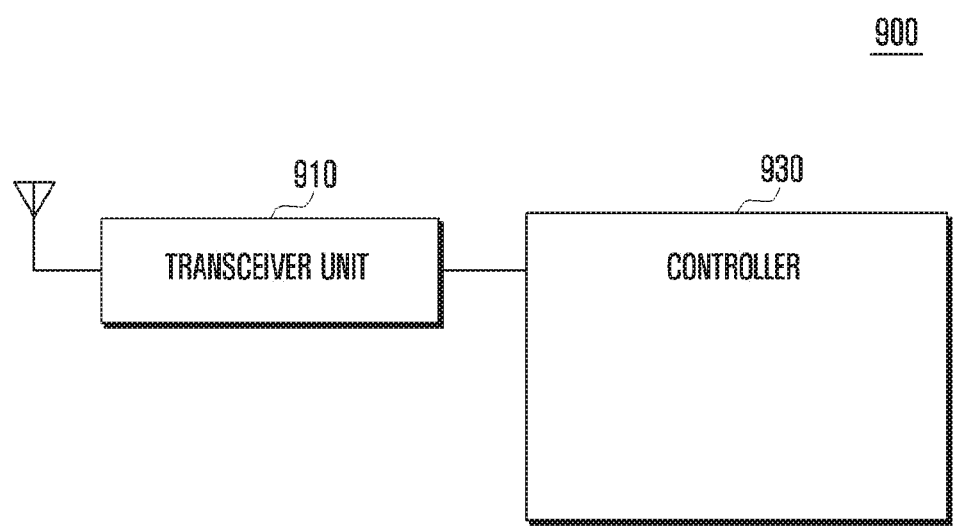
FIG. 9 is a diagram explaining a device of a terminal according to an embodiment of the present invention.

FIG. 9 is a diagram explaining a device of a terminal according to an embodiment of the present invention.

Referring to FIG. 8, a terminal 900 may include a transceiver unit 910 and a controller 930.

The terminal 900 may perform communication with at least one network node through the transceiver unit 910. The controller 930 may control the overall operation of the terminal.

The controller 930 may operate to transmit an uplink packet to a base station. Further, the controller 930 may operate to receive a downlink packet that is transmitted from the base station. The controller 930 may compensate for the lost packet in accordance with the compensation information that is received from the base station.

As described above, the terminal 900 according to an embodiment of the present invention has been described in a state where it is divided by blocks. However, this is for convenience in explanation, and the configuration and the operation of the terminal 900 according to the present invention is not limited thereto. Further, the controller 930 may perform not only the operation of the terminal as described above with reference to FIG. 9 but also the operation of the terminal according to an embodiment of the present invention as described above with reference to FIGS. 3A to 7.

Meanwhile, preferred embodiments of the present invention disclosed in this specification and drawings and specific terms used therein are illustrated to present only specific examples in order to clarify the technical contents of the present invention and help understanding of the present invention, but are not intended to limit the scope of the present invention. It will be evident to those skilled in the art that various implementations based on the technical spirit of the present invention are possible in addition to the disclosed embodiments.

The invention claimed is:

1. A method for improving a communication quality of a base station, comprising:
receiving a plurality of packets from a terminal;
determining whether a packet loss occurs based on a packet data convergence protocol sequence number (PDCP SN) of the received packets;
determining whether a size of a lost packet is smaller than a predetermined threshold value, in case that the packet loss has occurred;
identifying a type of the lost packet based on an interval between the received packets, in case that the size of the lost packet is smaller than the threshold value, wherein the type of the lost packet includes at least one of a sound packet or a silence packet; and
generating compensation information including a comfort noise packet based on the type of the lost packet,
wherein the comfort noise packet corresponds to the PDCP SN of the lost packet, and
wherein the comfort noise packet is generated by an adaptive multi rate (AMR) codec or an AMR wideband (AMR-WB) codec.

2. The method of claim 1, wherein the packets are voice over long term evolution (VoLTE) voice packets, and the voice packets are transmitted and received in a radio link control unacknowledged mode.

3. The method of claim 1, wherein determining whether the packet loss occurs comprises determining whether the packet loss occurs based on the PDCP SN of the received packet and a hyper frame number (HFN) of the received packets.

4. The method of claim 1, wherein identifying the type of the lost packet comprises:
identifying the type of the lost packet as a first type, when the interval between the received packets is a first time interval; and
identifying the type of the lost packet as a second type, when the interval between the received packets is a second time interval.

5. The method of claim 1, further comprising transmitting the compensation information to an upper node.

6. The method of claim 4, wherein a length of the first time interval is longer than a length of the second time interval.

7. The method of claim 4, wherein the first type includes a silence indication (SID) packet.

8. The method of claim 6, wherein generating compensation information comprises:
generating a first compensation information, when the type of the lost packet is identified as the first type; and
generating a second compensation information including the comfort noise packet, when the type of the lost packet is identified as the second type.

9. A base station, comprising:
a transceiver; and
a controller coupled with the transceiver and configured to:
control the transceiver to receive a plurality of packets from a terminal,
determine whether a packet loss occurs based on a packet data convergence protocol sequence number (PDCP SN) of the received packets,
determine whether a size of a lost packet is smaller than a predetermined threshold value, in case that the packet loss has occurred,
identify a type of the lost packet based on an interval between the received packets, in case that the size of the lost packet is smaller than the threshold value, wherein the type of the lost packet includes at least one of a sound packet or a silence packet, and
generate compensation information including a comfort noise packet based on the type of the lost packet,
wherein the comfort noise packet corresponds to the PDCP SN of the lost packet, and
wherein the comfort noise packet is generated by an adaptive multi rate (AMR) codec or an AMR wideband (AMR-WB) codec.

10. The base station of claim 9, wherein the controller is further configured to determine whether the packet loss occurs based on the PDCP SN of the received packet and a hyper frame number (HFN) of the received packets.

11. The base station of claim 9, wherein the controller is further configured to:
identify the type of the lost packet as a first type, when the interval between the received packets is a first time interval, and
identify the type of the lost packet as a second type, when the interval between the received packets is a second time interval.

12. The base station of claim 9, wherein the controller is further configured to control the transceiver to transmit the compensation information to an upper node.

13. The base station of claim 9, wherein the packets are voice over long term evolution (VoLTE) voice packets, and the voice packets are transmitted and received in a radio link control unacknowledged mode.

14. The base station of claim 11, wherein a length of the first time interval is longer than a length of the second time interval.

15. The base station of claim 11, wherein the first type includes a silence indication (SID) packet.

16. The base station of claim 14, wherein controller is further configured to:
generate a first compensation information, when the type of the lost packet is identified as the first type, and generate a second compensation information including the comfort noise packet, when the type of the lost packet is identified as the second type.

\* \* \* \* \*